United States Patent
Abou-El-Ella et al.

(10) Patent No.: US 9,143,886 B1
(45) Date of Patent: Sep. 22, 2015

(54) PRE-PROVISIONING AND DE-PROVISIONING FUNCTIONS FOR A MOBILE SYSTEM

(71) Applicant: Sprint Communications Company L.P., Overland Park, KS (US)

(72) Inventors: Hassan Abou-El-Ella, Overland Park, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 31 days.

(21) Appl. No.: 13/653,059

(22) Filed: Oct. 16, 2012

(51) Int. Cl.
*H04W 4/00* (2009.01)
*H04M 15/00* (2006.01)

(52) U.S. Cl.
CPC .............. *H04W 4/001* (2013.01); *H04M 15/88* (2013.01)

(58) Field of Classification Search
CPC .. H04W 4/001; H04M 3/42272; H04M 15/88
See application file for complete search history.

(56) References Cited

U.S. PATENT DOCUMENTS

| 2004/0242209 A1* | 12/2004 | Kruis et al. ................. 455/414.1 |
| 2010/0165877 A1* | 7/2010 | Shukla et al. ................. 370/254 |
| 2010/0274721 A1* | 10/2010 | Hammad ........................ 705/44 |
| 2012/0094633 A1* | 4/2012 | Parsons et al. ................. 455/411 |
| 2012/0295618 A1* | 11/2012 | Ahmavaara et al. ........ 455/435.1 |
| 2013/0023244 A1* | 1/2013 | El Hattachi ................... 455/413 |

* cited by examiner

*Primary Examiner* — Keith Fang

(57) ABSTRACT

A provisioning server comprising at least one processor, at least one memory area, at least one communications interface for sending and receiving data, and instructions stored in the memory. The instructions, when executed by the processor, receive and store mobile device data related to at least one of a mobile device reference number and a mobile device configuration, receive and store pre-provisioning data from at least one of a customer, a buyer, an equipment manufacturer, and a wireless service provider, and store instructions related to an activation event for a mobile device, wherein the activation event occurs in response to the mobile device being powered on for the first time.

16 Claims, 6 Drawing Sheets

PRE-PROVISIONING AND DE-PROVISIONING FUNCTIONS FOR A MOBILE SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The vast increase in wireless technology and the coverage of cellular service has led to an expansion in the types of devices which use mobile radio (e.g. cellular) technology. Such devices may include mobile telephones, smart phones, wireless internet access devices, cameras, portable credit card readers, portable bar code readers, ankle bracelets for monitoring released prisoners, GPS/data displays for rental cars, identification units for tracking objects such as shipping containers and rail cars, and numerous other applications.

To use a mobile device on a cellular network, it may first be provisioned. Provisioning a mobile radio device (e.g. a mobile phone) to operate on a wireless network involves defining and/or adjusting the mobile device's settings that are stored in the device, and the settings stored on the network, so that the mobile device may properly execute one or more desired applications, and the network may recognize the mobile device as authorized to receive service for those applications.

For example, a mobile phone may be provisioned for just voice service, voice and data service, special enterprise data service, internet access, e-mail, voice-mail, GPS-related services, location monitoring, etc. Provisioning may also include preferred roaming lists, user zone lists, language settings, browser settings, display settings, operating system versions, security settings, access restrictions, geographical settings, etc. The mobile radio device and cellular network must cooperate to provide these services.

The costs of wireless equipment and wireless service have both decreased. The capabilities of wireless equipment and wireless service have both increased. This has opened up new applications, where equipment and services may be purchased in bulk quantities.

SUMMARY

Embodiments relate to a provisioning server comprising at least one processor, at least one memory area, at least one communications interface for sending and receiving data and a plurality of instructions stored in the memory. The instructions, when executed by the processor, receive and store mobile device data related to at least one of a mobile device reference number and a mobile device configuration. The instructions also receive and store pre-provisioning data assigned to the mobile device data from at least one of a customer, a buyer, an equipment manufacturer, and a wireless service provider. The instructions on the server are further configured to store instructions related to an activation event for provisioning at least one mobile device by using the pre-provisioning data, wherein the activation event occurs in response to the mobile device being powered on for the first time.

Embodiments relate to a system for provisioning mobile devices substantially lacking graphical user interfaces, comprising a provisioning server connected to a network, configured to store a plurality of mobile device reference numbers assigned to a plurality of mobile devices lacking graphical user interfaces. The provisioning server is also configured to store at least one programming payload containing provisioning data and provisioning instructions to provision at least one of the plurality of mobile devices lacking a graphical user interface. The provisioning server is further configured to send the programming payload over a network when one of said plurality of said mobile devices is turned on for the first time, connects to the network, and sends a mobile device reference number matching one of the mobile device reference numbers stored on the server.

Embodiments relate to a method of provisioning a mobile telecommunication device, comprising storing, on a provisioning server, pre-provisioning data configured for a unique and identifiable mobile device, wherein the pre-provisioning data includes a programming payload, powering on the mobile device, and provisioning the mobile device with the programming payload in response to said powering on the mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
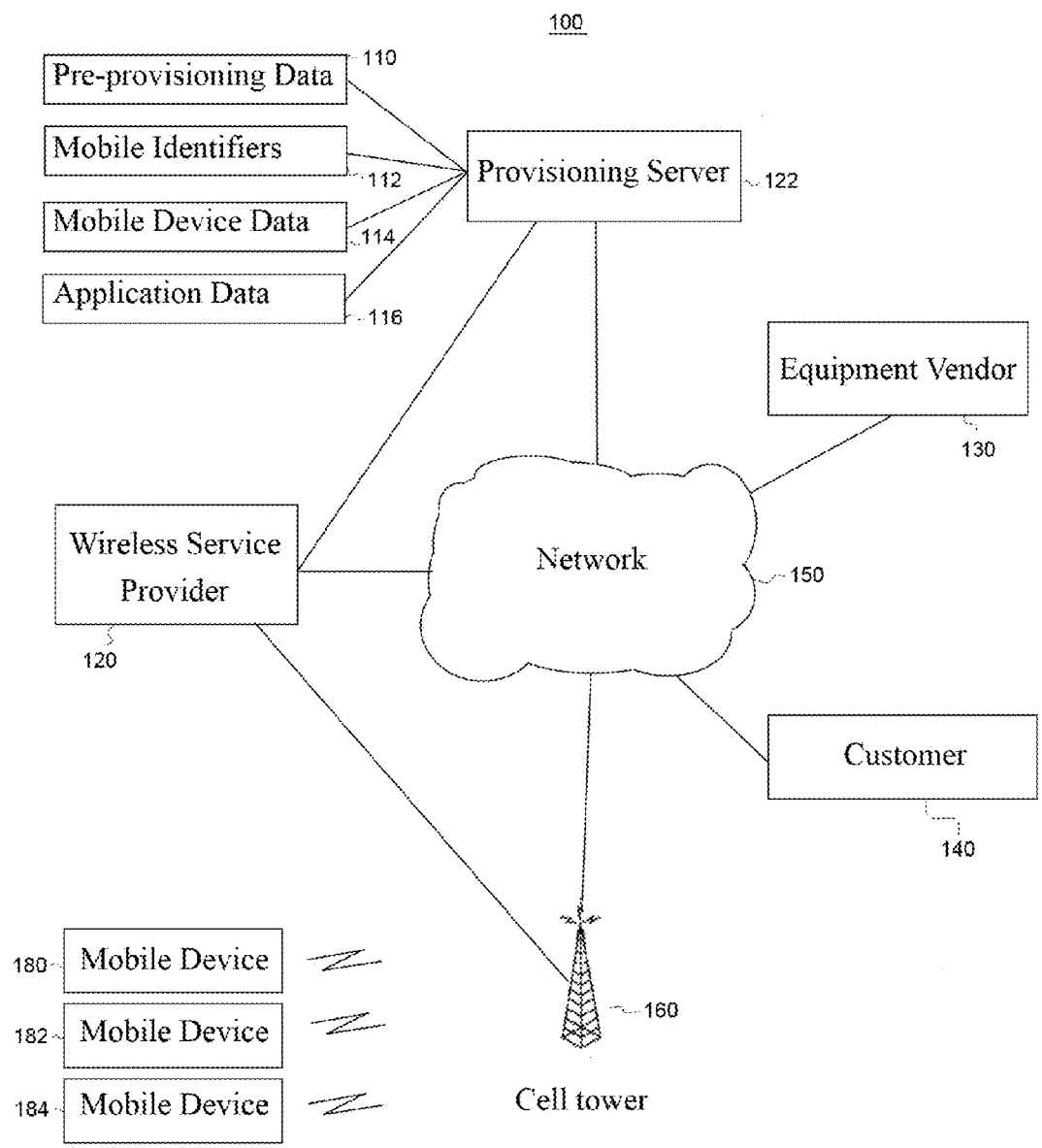
FIG. 1 illustrates a top level view of components according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

When mobile devices are provisioned on an individual basis, an end user will typically interact with a service provider or equipment vendor to choose the various particular settings for a mobile device: the telephone number, the account name and password, billing address, payment method, payment terms, service plan, applications, etc. This may take a substantial amount of time for an individual and an agent to get one device provisioned.

When mobile devices are provisioned in bulk, they may need to be allocated network resources and begin incurring costs immediately. For example, telephone numbers may be assigned from a limited pool, which the Wireless Service Provider may pay to acquire. Thus, after provisioning, charges begin to accrue.

At a basic level, from a business standpoint, provisioning involves matching and/or associating an account and payment source with a mobile device and authorized services. Customers of the service may use the same model of mobile device to access differing levels of service, or use different mobile device models to access the same service, and incur differing costs associated with those services.

Embodiments in this disclosure recognize and solve the problems of provisioning mobile devices. Instead of being completely provisioned all at once, mobile devices are provisioned in two stages. In the first stage, mobile devices are pre-provisioned. Pre-provisioning involves making all possible decisions to set up a mobile device, and storing the choices on a provisioning server. Choices may be things like geographical region, preferred roaming lists, area code, monthly rate plan, account number, etc. Choices may further include software application identifiers and device authentication parameters. Choices such as an area code for a number may be made, but the particular number assigned during activation may not be pre-provisioned.

In the activation phase, the mobile device actually receives all of the provisioning choices and programming stored in the provisioning server. The mobile device need only be powered on within wireless range of an authorized network connected to the provisioning server. The mobile device automatically sends a mobile device reference number to the authorized network. The mobile device will be recognized by the base transceiver station (BTS) and/or cell tower as pre-provisioned, so that the mobile device reference number is forwarded to the provisioning server. The server will match the mobile device reference number with stored pre-provisioning data, and automatically download the proper provisioning selections to the mobile device. Optionally, for devices with a user interface, the mobile device could send a query to the user asking for permission to proceed.

This technique of provisioning is particularly useful for purchases of mobile devices by companies who don't intend to put all of the devices into service immediately. All of the devices can be pre-provisioned by the purchasing agent of the company. End users associated with the company can provision the mobile devices as intended merely by turning the mobile devices on when they are needed.

Alternatively, a pre-provisioning system may also be particularly useful in a rental setting. When a mobile device is embedded in or attached to a piece of machinery being serially rented to different customers (for example, a navigation and internet information appliance embedded in a rental car), it is useful to shift the device between a pre-provisioned state and a provisioned state and back to a pre-provisioned state. A client application in the mobile device may allow the device to be provisioned and de-provisioned in a simple, straight forward manner. The rental agency need only pre-provision the mobile device, and give the user instructions on how to provision it (e.g., turn it on, or turn it on and hit the "yes" button—that will signify your agreement to rent the services of the mobile device along with the car). The end user need not decide whether to rent the embedded mobile device until the need arises (e.g. the user is lost, needs to receive a document, looking for a restaurant, etc.).

As used herein, the term "end user" shall refer to the intended user of the mobile device and not to people who could arguably be called users in the supply chain. It does not include, for example, people involved in the manufacture and sale of the item who may test or demonstrate the item. In some cases, it may not even include the buyer of the mobile device, if the buyer merely supplies it in original condition to another who will put it to actual use. The term "end user" does include, for example, a person who uses a mobile credit card reader to sell hot dogs in a stadium or a customer who rents a mobile device from a rental agency.

As used herein, the term "mobile device reference number" is intended to denote any number which identifies a particular piece of mobile equipment, and which may be installed prior to distribution to an end user by the manufacturer, distributor, or service provider. It may be, for example, an Electronic Serial Number (ESN), an International Mobile Equipment Identity (IMEI), International Mobile Subscriber Identity (IMSI), a Mobile Equipment Identifier (MEID), any equivalent type of number, or a combination of any of these numbers.

As used herein, the term "pre-provisioning data" may be defined as any combination of provisioning data and meta-provisioning data. Provisioning data may be used to provision a mobile device, or in other words, to configure a particular mobile device to be used by a particular end-user with a particular level of service. Meta-provisioning data relates to the provisioning data to a customer service, a customer account, an end user, and methods of installing the provisioning data.

As used herein, the terms "customer," "buyer," "equipment vendor," "manufacturer," and "wireless service provider," as well as other like terms, are meant to encompass agents, benefactors, associates and other stand-ins or equivalents of the principals.

FIG. 1 illustrates the structure of an exemplary pre-provisioning system 100 which supports some embodiments of the disclosure. Provisioning server 122 may be configured to provision mobile devices 180, 182 and 184 in two distinct stages: a first pre-provisioning stage where the appropriate mobile device reference numbers, mobile device data, and application data may be associated and organized as a programming payload in the provisioning server 122 and associated data storage areas 110, 112, 114, and 116. (Hereinafter, mobile devices 180, 182 and 184, which are exemplary and represent any number of mobile devices, may be referred to by a representative from the class, such as mobile device 180.) In the second stage, where the pre-provisioning choices are activated on mobile device 180, the system 100 is configured to transfer the chosen settings and provisions as a programming payload for the mobile device 180 upon the triggering of an activation event. In some embodiments, this activation event is the first time the mobile device 180 is powered on by an end user in range of a properly configured cell tower 160. In some embodiments, the term "first time" excludes any instance of testing or other process performed while the mobile device is in the supply chain, before it is delivered to an end user. A properly configured cell tower 160 is one which will connect a mobile device 180 to at least one of network 150, wireless service provider 120, equipment vendor 130, and provisioning server 122. Alternatively, a wireless access point or peer mobile device 182 may serve to connect the mobile device 180 to the network 150. Also, alternatively, the mobile device 180 may require a single provisioning trigger in addition to turning the mobile device 180 on. This may be accomplished by pushing a button or answering a query from the mobile device 180.

Provisioning server 122 may be controlled by wireless service provider 120, and connected to network 150. Provisioning server 122 may be configured to send and receive information to and from equipment vendor 130, customer 140, wireless service provider 120, and, via cell tower 160, to and from mobile device 180. Also, provisioning server 122 may store and retrieve data from its data storage areas. Data types pre-provisioning data 110, mobile identifiers 112 (e.g. mobile device reference numbers), mobile device data 114, and application data 116 are shown as examples only, and are not meant to be an exhaustive list of the data stored and retrieved by provisioning server 122.

System 100 may be configured to allow an equipment vendor 130 to connect via the network 150 to a customer 140, wireless service provider 120, and in some embodiments, to provisioning server 122. In some embodiments, all of the information provided by equipment vendor 130 is stored on provisioning server 122 until it is required by mobile device 180. In some embodiments, equipment vendor 130 may download information and programs to mobile device 180 prior to providing them to customer 140. Equipment vendor 130 may or may not be separate from wireless service provider 120 in a business sense; this makes little difference to the functioning of pre-provisioning system 100. Even if equipment vendor 130 and wireless service provider 120 fit under the same corporate umbrella, they may operate as separate entities functionally. In other words, the people in the company who sell wireless mobile devices 182, 184, 186 to customers may not be the same people who install and run the equipment that allows the provisioning server 122 to communicate properly with cell tower 160.

The system 100 may be configured to allow customer 140 to communicate directly with equipment vendor 130 or indirectly through network 150. In some embodiments, the system 100 may be configured to allow customer 140 to communicate provisioning choices directly with provisioning server 122 through network 150. Customer 140 must communicate choices relative to the provisioning of the mobile devices 182, 184, 186, such as service plan, monthly charges, method of payment, authorization for add-on services, device personalization (for example, company contact lists), optional applications to be loaded on each mobile device, roaming preferences, area code preferences, and any other thing that needs to be set on a mobile device 180 in order for it to operate as desired.

The selections of a customer 140 may be made on an individual basis and stored separately on the provisioning server 122. A mobile device 180 may have features with adjustable settings not found on other mobile devices. For example, some mobile devices may not have user interfaces, so that installing a web browser on such a device may not result in a functioning product. As another example, some mobile devices may not be compliant with the latest deployed generation of cellular digital communications technology, such as 4G, while other mobile devices are compatible. Thus, in addition to information about customer 140 and services provided by wireless service provider 120, the provisioning server 122 stores information about mobile devices 182, 184, 186.

Customer 140 may be, for example, an authorized buyer in a corporation, or any other person representing the customer.

It is also contemplated that customer 140 may be under the same corporate umbrella as equipment vendor 130, or even wireless service provider 120. In other words, customer 140 may manufacture or otherwise provide their own equipment and deal directly with wireless service provider 120.

Wireless service provider 120 may be responsible for configuring the system 100 to work with the provisioning server 122, mobile devices 182, 184, 186, equipment vendor 130, and customer 140. The wireless service provider 120 may configure system 100 to allow all mobile devices 182, 184, 186 to be pre-provisioned and subsequently activated. Three mobile devices are shown, for example, but the actual number may be any number that can be produced. Again, where only one mobile device is referenced, it should be understood as representative of any number of mobile devices.

A mobile device 180 may be manufactured with one or more mobile device reference numbers which serve to identify the mobile device 180 to network 150, wireless service provider 120, and any other entity connected directly or indirectly to cell tower 160. The mobile device reference number may be any one of a serial number, Electronic Serial Number (ESN), an International Mobile Equipment Identity (IMEI), International Mobile Subscriber Identity (IMSI), Mobile Equipment Identifier (MEID), or any other identification number devised to identify a mobile device 180 generally. The identification number may be stored permanently in the mobile device 180, or it may be stored on a removable component of mobile device 180 such as a Removable User Identity Module (R-UIM), CDMA Subscriber Identity Module (CSIM), Subscriber Identity Module (SIM), or other removable mobile identification card. Mobile device 180 may have one or more identifying numbers stored in one or more locations. For example, mobile device 180 may have a subscriber identity stored on a removable SIM and an MEID stored in internal, non-removable, non-volatile memory.

While the mobile device reference number may be associated with the mobile device 180 during manufacture, other numbers that serve to identify the mobile device 180 may be provisioned. An example may be a ten digit telephone including an area code. Another example may be an Internet protocol address.

In one scenario, as an example, Franko Hot Dog Systems Company may purchase, from equipment vendor Park Payment Products, thousands of wireless card reading units for selling hot dogs in the upcoming NFL season at NFL stadiums with wireless service from service provider Run Very Fast Mobile. A prudent buyer working for Franko may purchase 2,400 wireless reading units in April, to make sure Park Payment can fulfill the order and ship the credit card readers well before the NFL pre-season begins.

Consider what may happen without pre-provisioning, if the prudent buyer tries to save money, and does not set up accounts for each reader. This means each hot dog vendor working with Franko may provision their system with Run Very Fast Mobile. If, for example, only two percent of hot dog vendors have real trouble with this method, and half of those complain to Franko Hot Dog Systems, that equates to 24 complaints. After the 24th complaint, the prudent buyer may attempt a different approach, in the absence of pre-provisioning.

The following year, the prudent buyer may order all the scanners for delivery August 1, and have them all provisioned on that day. During the preseason, perhaps only half the units may be used. Franko Systems may see reduced profits, due in part to paying for unused wireless contracts for card scanners.

The prudent buyer may be told to go back to individual provisioning, and not to worry about a few complaining hot dog vendors.

In another scenario in the absence of pre-provisioning, Private Prisons Unlimited may have a buyer purchase ankle bracelets for all the early release prisoners for the coming year. The ankle bracelets may have no user interface, and are difficult for a user to provision. PPU may prefer that a prisoner not have access to any user interface. PPU's buyer may need to provision all the bracelets. Run Very Fast may assign a telephone number, network ID, and use cellular resources for each ankle bracelet, and may charge PPU for each bracelet as it is provisioned. The buyer may either spend time to save money, provisioning each bracelet as it is needed, or pay for unnecessary services, and reserve cellular resources when they are not currently needed. An appropriately configured pre-provisioning system may extricate the buyer from this dilemma.

Mobile devices 182, 184, 186 may be purchased in bulk from equipment vendor 130 by customer 140, and stored for later use. Around the time of the sale, equipment vendor 130 and customer 140 decide what services to provide with mobile devices 182, 184, 186. Either equipment vendor 130 or customer 140 may send the selections to wireless service provider 120, together with the mobile device identity numbers. Wireless service provider 120 in turn decides how to configure the mobile devices 182, 184, 186 to match the request from the equipment vendor 130 or customer 140. Provisioning server 122 may pre-provision mobile devices 182, 184, 186 by storing a programming payload together with identifying information for the mobile device 180 in the data areas 110, 112, 114, or 116 of provisioning server 122.

Once mobile devices 182, 184, 186 are pre-provisioned, they may be activated and put into service individually simply by being turned on in a geographic area served or covered by wireless service provider 120 or its designees. So, for example, on a first date mobile device 180 is turned on, communicates a mobile device reference number to cell tower 160, and is automatically connected with provisioning server 122 to receive a programming payload. The mobile device 180 may have a client application initially loaded that allows the client to send the appropriate request to the network 150, and to receive the programming package that is supplied. The network 150 must be appropriately configured to recognize the mobile device reference number. As part of this process, the network 150 validates that the mobile device reference number is pre-queued for activation. Alternatively, mobile device 180 may connect to network 150 through a wireless access point, or a peer mobile device (e.g., mobile device 182).

Mobile device 180 then programs itself with the programming payload, and thereafter goes into service. Wireless service provider 120 then may put mobile device 180 on the customer's account, and begin a billing period. On a second date, a second mobile device 182 may be turned on, connected to provisioning server 122, receive a programming payload, and program itself. Wireless service provider 120 then adds mobile device 182 to the customer's account, and begins billing for that device. As of the second date, mobile device 184 is still in an inactive state, and not being charged to customer's account. Mobile device 184 may be activated at a later date.

Mobile device 180 may also have a de-provision function that essentially returns it to a pre-provisioned state, after mobile device 180 has been provisioned. By returning the mobile device 180 to this state, the prior resources, such as a telephone number or other account access, allocated by the wireless service provider 120, are released. The mobile device 180 may then send out a provisioning request the next time it is powered on. Once provisioned, the mobile device 180 may not send out another provisioning request when it is powered on, unless affirmative steps are taken by one of the user, user agent, equipment vendor 130, provisioning server 122, or wireless service provider 120.

This re-pre-provisioning may be useful for a mobile device 180 designated for rental applications, or other short term use. This function may also be useful to allow for testing and quality assurance during manufacture and in the supply chain. Such a function, returning to a pre-provisioned state, could be invoked by the user, the provisioning server 122, the wireless service provider 120, the equipment manufacturer, or an equipment vendor 130, as appropriate. It may also be invoked automatically by the mobile device 180 after a specified period, absent some action on the part of the user. For example, the mobile device 180 may be provisioned with a day-pass time limit, such that after 24 hours, the mobile device 180 will automatically de-provision itself. Of course, any arbitrary time period other than 24 hours may be chosen. In some embodiments, the de-provisioning function may be unavailable to the end user or other parties, to prevent errors or misuse. In some embodiments, each time the mobile device 180 is turned on, it may be re-provisioned.

In some embodiments, the de-provisioning process will be executed by a client program stored on the mobile device. This function may erase all user data and return all settings to their factory default values. In other embodiments, the de-provisioning process may be executed by a programming payload sent by the provisioning server.

In some embodiments, it may not be necessary for the mobile device 180 to send a provisioning request. The device may only send a mobile device reference number to an appropriate cell tower 160, and the identification number may be routed to the provisioning server 122. Upon receipt of packet(s) containing the identification number, the provisioning server 122 will reply to the mobile device 180 with a programming payload. In some embodiments, it may be necessary that the programming payload contain an instruction to the mobile device 180 to receive and install the programming package, and to execute the instructions contained therein.

As an example, a customer 140 which operates a business selling insurance may wish to buy and use a set of cameras for a large number of insurance adjusters working for the customer. The cameras are capable of both GPS location services and cellular communications. The customer 140 arranges to buy 1,000 cameras for use by adjusters in the aftermath of very large events such as hurricanes or earthquakes (adjusters are end users). At the time, no one knows if, when, and how many of the cameras will be put into service. Customer 140 and equipment vendor 130 agree to pre-provision the phones with GPS applications and cellular data transfer services to allow the pictures to be tagged with a location and time, and immediately sent to the insurance company for further use. The cameras will be pre-provisioned so that they will be activated only on the days they are turned on once.

On a first date, tornados hit a major city and 500 insurance adjusters need to be dispatched to photograph damage to many locations. The cameras are taken from storage, and as each is turned on, it is provisioned automatically by Provisioning Server 122. Each phone remains active for one day. On the second day, 400 cameras are returned to storage, and 100 are re-activated by turning them on. On the third day, the final 100 cameras are returned to storage, and go inactive. At some date months in the future, a hurricane could lead to all thousand cameras being pressed into service for a few days.

Pre-provisioning allows all 1,000 cameras to be set up for final provisioning with one transaction. None of the insurance adjusters need to be involved in setting up a camera with cellular capabilities. Yet the insurance company is not charged until they use the cameras (and associated GPS and cellular services). The wireless service provider 120 may keep available resources pooled, until they are needed for particular customers.

There are many other examples of businesses that would benefit from pre-provisioning mobile devices 182, 184, 186. A car rental agency may wish to provide mobile devices to their customers with the car—for example, mobile data, voice and GPS services. These may be built into the car as a head unit, telematics unit, or other arrangement, whether tightly integrated into the vehicle or added on in the aftermarket. This may be accomplished with pre-provisioning: if the car renter, who is the end user of the system, turns on the mobile device 180, they may have implicitly agreed to rent it, and provisioning server 122 automatically provisions the mobile device 180 according to arrangements with the car rental agency and/or car renter. Alternatively, there may be one or more additional confirmation steps or actions requested of the end user. The rental agency or car renter may be charged only for the days the mobile device 180 was used.

In another example, referenced above, ankle monitors may be activated for a house-arrest or probation monitoring program. The ankle monitors could be purchased and pre-provisioned in bulk, and individually activated by the end user (the corrections officer—in this case the prisoner would not generally be considered an end user) on an as-needed basis, and deactivated when the person being monitored is fully released. In this case, the programming payload could depend on the location of the ankle bracelet when it is activated. For example, an application could specify that the ankle monitor report when it moves a specified distance from it's initial location when activated.

In another example, referenced above, Franko Hot Dog Systems could pre-provision their credit card readers well in advance of the season, but not incur costs until each unit is put into service. Alternatively, the readers may be provisioned only on Sunday, with a day-pass that deactivates each reader at the end of each day, returning the provisioned resources to the Wireless Service Provider.

Figure 2:
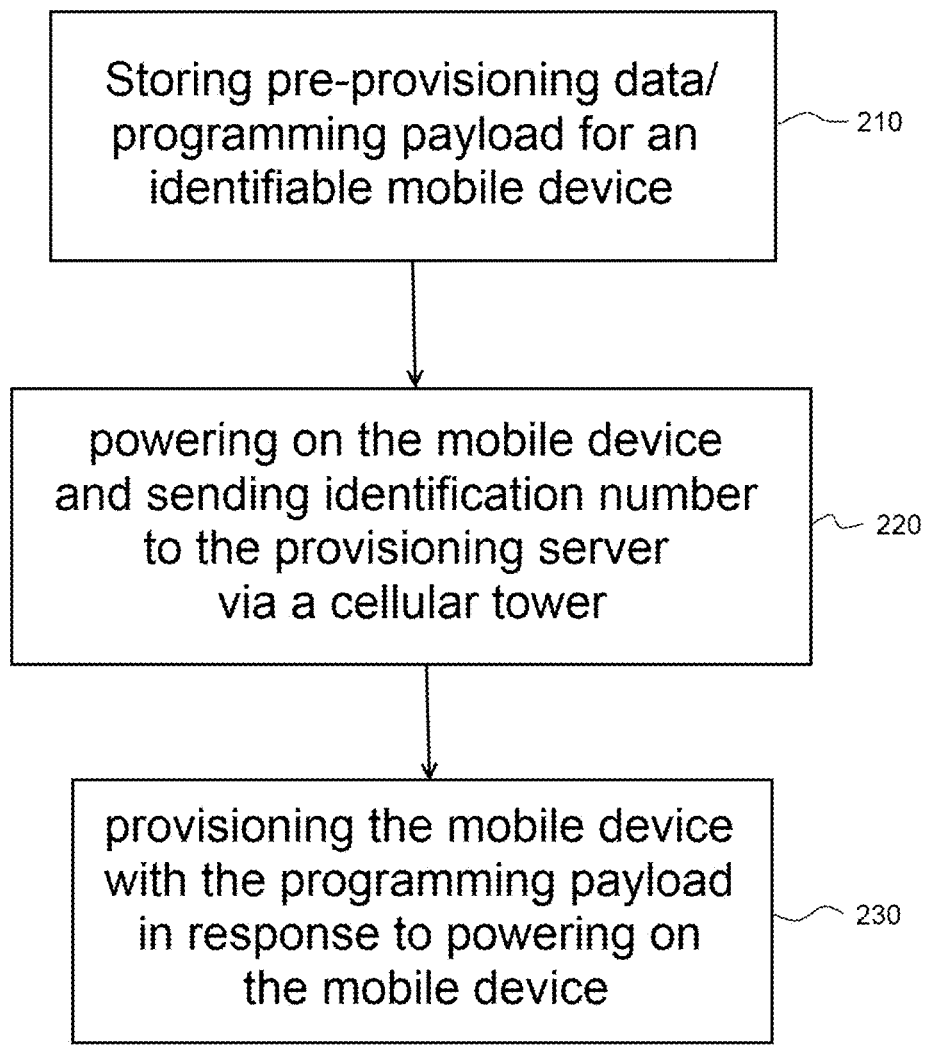
FIG. 2 illustrates a flow chart of a method according to an embodiment of the disclosure.

FIG. 2 illustrates a high level flow chart of the pre-provisioning and provisioning process described in the disclosure. In box 210, the pre-provisioning data and programming payload for a particular mobile device 180 or set of mobile devices 180-186 is stored. The programming payload may include a set of provisioning data, executable instructions, provisioning meta-data which may be necessary for the mobile device to carry out the provisioning process without the necessity of input from the end user.

The pre-provisioning data may be stored as a mix of provisioning data and meta-provisioning data. In other words, provisioning data, by themselves, for a mobile device 180 may not be enough. There may be metadata and executable instructions defining how to transport the data to the mobile device 180 and install it. There may be data about who is authorized to change the data and other types of data that are not strictly provisioning data.

In the next portion 220 of the flow diagram in FIG. 2, the mobile device 180 may be powered on and send a mobile device reference number (or more loosely, an identification number) to the cellular tower 160. A base transceiver station at the cellular tower may be capable of recognizing the mobile device reference number as pre-provisioned. The cell tower mediates a connection from the mobile device 180 to provisioning server 122. The mobile device 180 is recognized by the network 150 and the provisioning server 122 by its mobile reference number or numbers.

In the next portion 230 of the flow diagram of FIG. 2, the mobile device may be provisioned with the programming payload from provisioning server 122. This may occur when the mobile device 180 is turned on. The provisioning server 122 may communicate with client software on the mobile device 180 to effectuate an installation of the provisioning data. For example, the programming payload may be sent via Short Message Service, Multimedia Messaging Service or Wireless Application Protocol. Optionally, the end user may input a confirmation that the mobile device 180 is intended to be provisioned.

Figure 3:
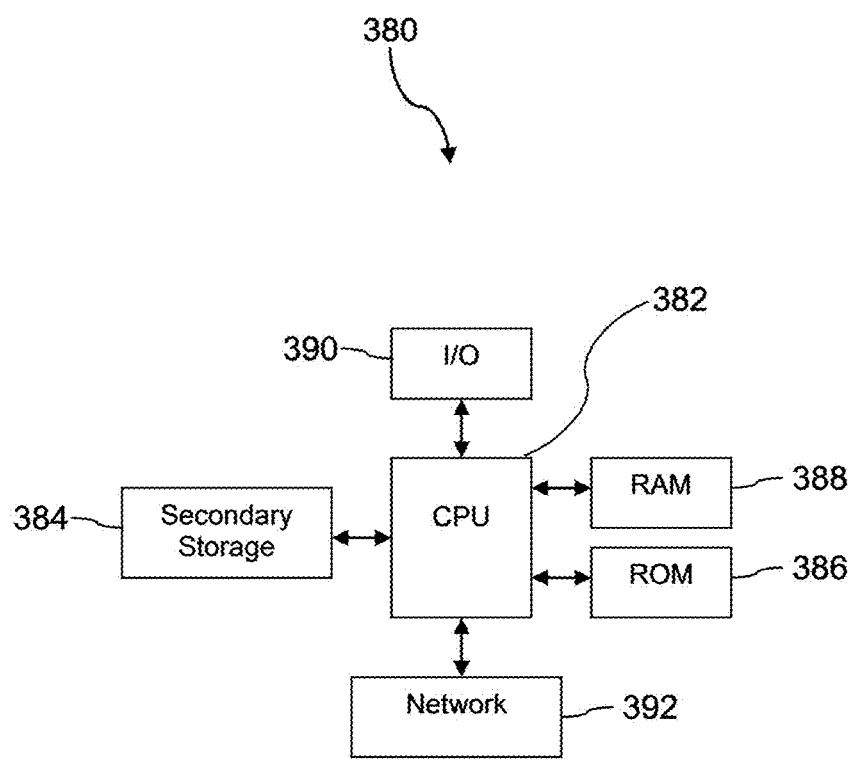
FIG. 3 is a block diagram of a computer system according to an embodiment of the disclosure.

FIG. 3 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips. For example, the provisioning server 122 may take the form of computer system 380, with data 110, 112, 114, or 116 residing on any of the secondary storage 384 or RAM 388. Computer system 380 may also serve as the basis for the connections between the network 150 and: customer 140, equipment vendor 130, and wireless service provider 120.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

Figure 4:
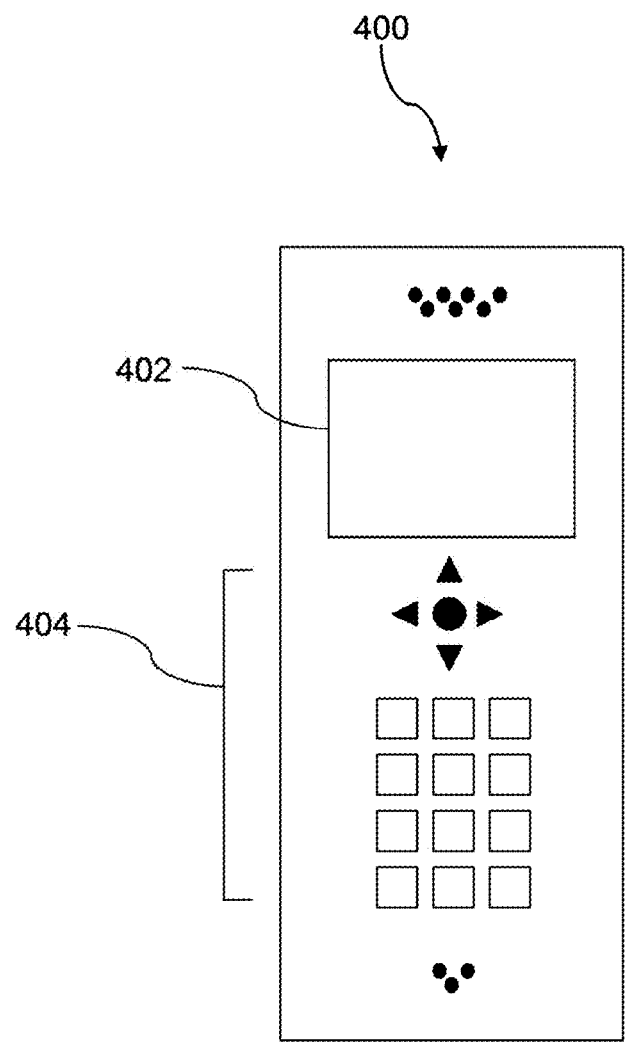
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. For example, mobile devices 182, 184, 186 may be embodied as mobile device 400. Though illustrated as a mobile phone, the mobile device 400 may take various forms including a wireless handset, a pager, a personal digital assistant (PDA), a gaming device, or a media player. The mobile device 400 may include a display 402 and a touch-sensitive surface and/or keys 404 for input by a user. As mentioned previously, in some embodiments, there may be no user interface on mobile device 400. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, as detailed extensively above, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
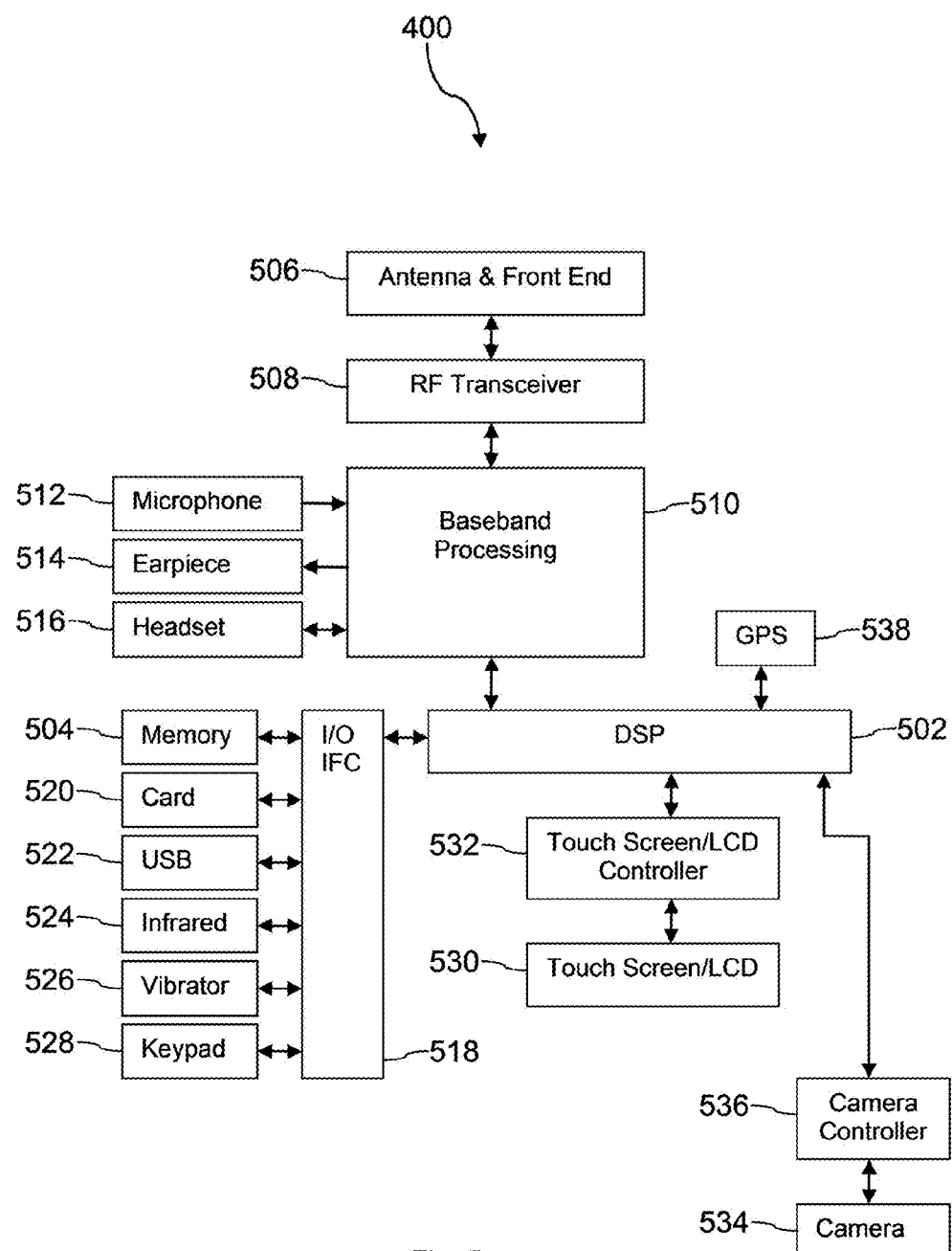
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in some embodiments, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
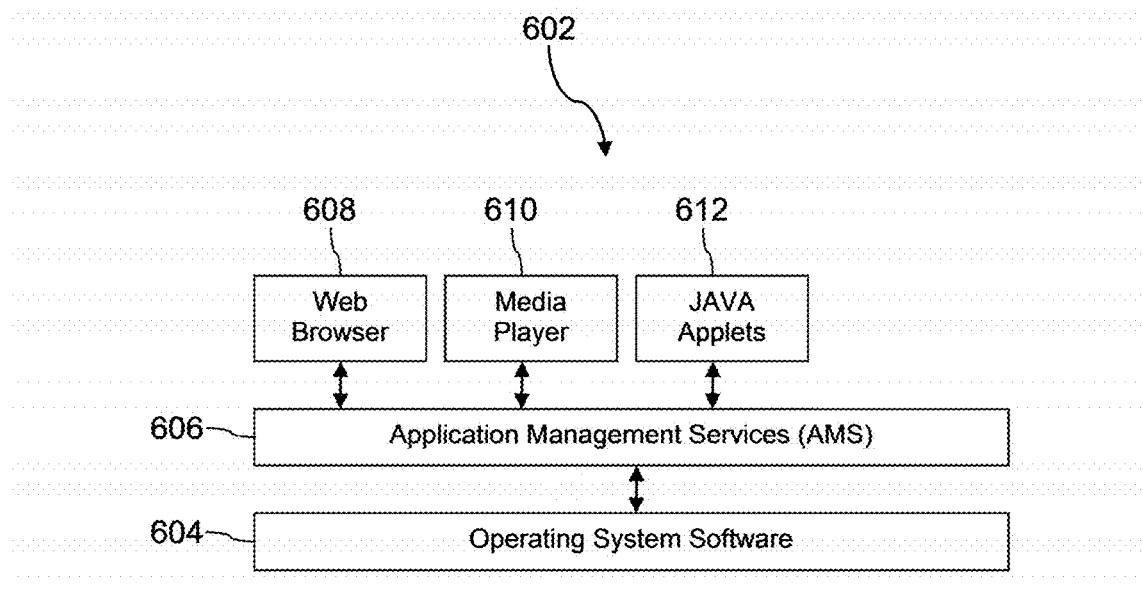
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
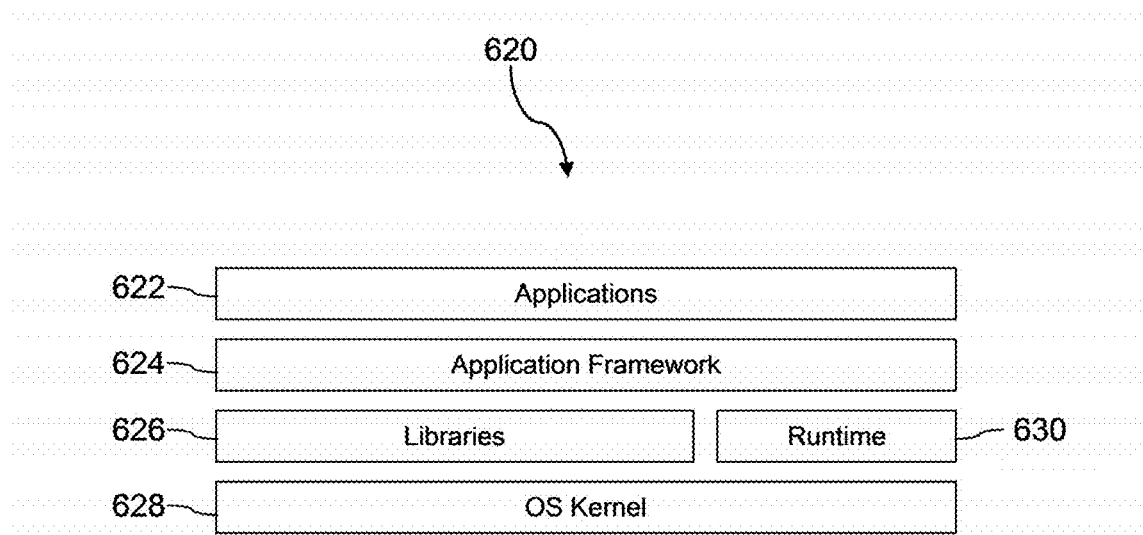
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A provisioning server comprising:
   at least one processor;
   at least one non-transitory memory;
   at least one communications interface for sending and receiving data; and
   a plurality of instructions stored in the non-transitory memory, which, when executed by the at least one processor:
      receives and stores a mobile device reference number related to a mobile device that is not yet completely provisioned for wireless service on a wireless network,
      receives and stores pre-provisioning data of the mobile device assigned to the mobile device reference number from at least one data store associated with a customer, a buyer, an equipment manufacturer, or a wireless service provider prior to the mobile device being powered on for a first time by an end user of the mobile device, wherein the pre-provisioning data includes a programming payload with all information necessary to initially provision and activate the mobile device for wireless service, the programming payload comprises a plurality of a customer account identifier, a mobile device identifier, a mobile device type, or a rate plan,
      stores instructions related to an activation event for provisioning the mobile device by using the pre-provisioning data, wherein the activation event occurs in response to the mobile device being powered on for the first time,
      in response to the mobile device being powered on for the first time by the end user of the mobile device and communicating only a mobile device reference number for the mobile device to a cellular network tower via wireless signal, receives only the mobile device reference number from the mobile device,
      based on reception of only the mobile device reference number from the mobile device, matches the mobile device reference number received from the cellular network tower with the stored mobile reference number,
      in response to matching the mobile device reference numbers, sends the programming payload over the wireless network to the mobile device to initially activate and completely provision the mobile device, wherein the mobile device is completely provisioned merely by the mobile device being turned on, and wherein the mobile device is initially activated and put into service by provisioning itself with the programming payload received from the provisioning server, and
      subsequent to the mobile device being activated and provisioned by the programming payload, sends an updated programming payload that at least one of re-provisions or de-provisions the mobile device after a predetermined time interval via the wireless network, wherein a de-provision process executes by the updated programming payload sent by the provisioning server or a client program stored on the mobile device.

2. The provisioning server in claim 1, wherein the mobile device being powered on for the first time excludes any instance of testing or other process performed while the mobile device is in the supply chain.

3. The provisioning server of claim 1, wherein, from the end user's perspective, the end user of the mobile device merely has to turn on the mobile device in range of at least one cellular network tower to initially activate the mobile device.

4. A system for provisioning mobile devices, comprising:
   a provisioning server having at least one processor and a non-transitory memory connected to a network that:
      stores a plurality of mobile device reference numbers assigned to a plurality of mobile devices that is not yet completely provisioned for wireless service on a wireless network;
      stores pre-provisioning data for each of the plurality of mobile devices prior to the plurality of mobile devices being powered on for a first time by end users of the plurality of mobile devices, wherein the pre-provisioning data for each of the plurality of mobile devices includes a corresponding programming payload with all information necessary to initially provision and activate service on the corresponding mobile device, the programming payload for each of the plurality of mobile devices comprises a plurality of a customer account identifier, a mobile device identifier, a mobile device type, or a rate plan;
      in response to a mobile device of the plurality of mobile devices being powered on for a first time by an end user of the mobile device and communicating only a mobile device reference number for the mobile device to a cellular network tower via wireless signal, receives only the mobile device reference number from the mobile device;
      based on reception of only the mobile device reference number from the mobile device, matches the mobile device reference number received from the cellular network tower with the corresponding stored mobile device reference number;
      in response to matching the mobile device reference numbers, sends the corresponding programming payload over the network to the mobile device to initially activate and completely provision the mobile device, wherein the mobile device is completely provisioned merely by the mobile device being turned on, and wherein the mobile device is initially activated and put into service by provisioning itself with the corresponding programming payload received from the provisioning server; and
      subsequent to the mobile device being activated and provisioned by the corresponding programming payload, sends an updated programming payload that at least one of re-provisions or de-provisions the mobile device after a predetermined time interval via the wireless network, wherein a de-provision process executes by the updated programming payload sent by the provisioning server or a client program stored on the mobile device.

5. The system of claim 4, wherein the corresponding programming payload, when downloaded to the mobile device, causes the mobile device to accept an assigned mobile telecommunications access number.

6. The system of claim 4, wherein the corresponding programming payload comprises instructions capable of causing the mobile device to provision itself.

7. The system of claim 4, wherein the corresponding programming payload is provided via one of Short Message Service, Multimedia Messaging Service or Wireless Application Protocol.

8. The system of claim 4, wherein each programming payload includes the customer account identifier, the mobile device identifier, the mobile device type, and the rate plan.

9. The system of claim 4, wherein the corresponding programming payload includes at least one of: a geographical location setting, a software application identifier, or a device authentication parameter.

10. The system of claim 4, wherein the corresponding programming payload includes a mobile device number.

11. A method of provisioning a mobile telecommunication device, comprising:
- storing, on a provisioning server, pre-provisioning data configured for a mobile device that is not completely provisioned for wireless service on a wireless network prior to the mobile device being powered on for a first time by an end user of the mobile device, wherein the pre-provisioning data includes a programming payload with all information necessary to initially provision and activate service on the mobile device, the programming payload comprises a plurality of a customer account identifier, a mobile device identifier, a mobile device type, or a rate plan;
- in response to the mobile device being powered on for the first time by the end user of the mobile device and communicating only a mobile device reference number for the mobile device to a cellular network tower via wireless signal, receiving, by the provisioning server, only the mobile device reference number from the mobile device;
- matching, by the provisioning server, the mobile device reference number received from the cellular network tower with the stored mobile device reference number;
- in response to matching the mobile device reference numbers, sending, by the provisioning server, the programming payload over the wireless network to the mobile device to initially activate and completely provision the mobile device, wherein the mobile device is completely provisioned merely by the mobile device being turned on, and wherein the mobile device is initially activated and put into service by provisioning itself with the programming payload received from the provisioning server; and
- subsequent to the mobile device being activated and provisioned by the programming payload, sending, by the provisioning server, an updated programming payload that at least one of re-provisions or de-provisions the mobile device after a predetermined time interval via the wireless network, wherein a de-provision process executes by the updated programming payload sent by the provisioning server or a client program stored on the mobile device.

12. The method of claim 11, further comprising:
- after the mobile device is initially provisioned, performing the de-provisioning process on the mobile device causing the mobile device to be returned to a deprovisioned state;
- updating, on the provisioning server, the pre-provisioning data configured for the mobile device, wherein the updated pre-provisioning data includes the updated programming payload; and
- in response to powering on the mobile device another time, sending, by the provisioning server, the updated programming payload to the mobile device to re-provision the mobile device.

13. The method of claim 12, wherein the de-provisioning of the mobile device occurs after a predetermined time interval.

14. The method of claim 11, wherein the mobile device reference number includes at least one of an Electronic Serial Number, an International Mobile Equipment Identity, an International Mobile Subscriber Identity, or a Mobile Equipment Identifier.

15. The method of claim 11, wherein the provisioning data includes at least one of a telephone number, an account number, an account name, or a wireless service provider identifier.

16. The method of claim 11, wherein the provisioning data includes device settings that work on the identifiable mobile device, and do not work on other types of mobile devices which are configured to be connected to the provisioning server.

* * * * *